US012555793B2

United States Patent
Jin et al.

(10) Patent No.: US 12,555,793 B2
(45) Date of Patent: Feb. 17, 2026

(54) ELECTRODE FOR SECONDARY BATTERIES AND METHOD FOR PRODUCING SAME

(71) Applicant: PANASONIC INTELLECTUAL PROPERTY MANAGEMENT CO., LTD., Osaka (JP)

(72) Inventors: Takuya Jin, Osaka (JP); Daisuke Katou, Kyoto (JP); Shinichiro Kondo, Osaka (JP); Reiko Izumi, Osaka (JP); Masaya Ugaji, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 628 days.

(21) Appl. No.: 17/911,507

(22) PCT Filed: Jan. 19, 2021

(86) PCT No.: PCT/JP2021/001563
§ 371 (c)(1),
(2) Date: Sep. 14, 2022

(87) PCT Pub. No.: WO2021/192541
PCT Pub. Date: Sep. 30, 2021

(65) Prior Publication Data
US 2023/0108728 A1    Apr. 6, 2023

(30) Foreign Application Priority Data

Mar. 24, 2020    (JP) ................. 2020-052754

(51) Int. Cl.
*H01M 4/62*    (2006.01)
*H01M 4/02*    (2006.01)
(Continued)

(52) U.S. Cl.
CPC ............ *H01M 4/623* (2013.01); *H01M 4/13* (2013.01); *H01M 4/139* (2013.01); *H01M 2004/021* (2013.01)

(58) Field of Classification Search
None
See application file for complete search history.

(56) References Cited

U.S. PATENT DOCUMENTS 5,952,123 A * 9/1999 Hatanaka ................ H01M 4/14
429/225
5,989,746 A    11/1999 Bernard et al.
(Continued)

FOREIGN PATENT DOCUMENTS

CN    104530276 A    4/2015
JP    H11-007952 A    1/1999
(Continued)

OTHER PUBLICATIONS

JP-2001307716-A English machine translation (Year: 2001).*
(Continued)

*Primary Examiner* — Scott J. Chmielecki
(74) *Attorney, Agent, or Firm* — WHDA, LLP

(57) ABSTRACT

This electrode for secondary batteries is provided with a core material and an electrode mixture sheet that is bonded to the surface of the core material. The electrode mixture sheet contains an active material, a fibrous first binder and a particulate second binder; and the second binder is mainly composed of a polyvinylidene fluoride, while having a volume-based median diameter of 50 μm or less. The first binder is mainly composed, for example, of a polytetrafluoroethylene.

5 Claims, 2 Drawing Sheets

(51) Int. Cl.
*H01M 4/13* (2010.01)
*H01M 4/139* (2010.01)

(56) References Cited

U.S. PATENT DOCUMENTS

| | | |
|---|---|---|
| 2001/0044045 A1 | 11/2001 | Sato et al. |
| 2015/0147660 A1 | 5/2015 | Fujiki et al. |
| 2015/0303481 A1 | 10/2015 | Duong et al. |
| 2020/0028156 A1 | 1/2020 | Zhang et al. |
| 2021/0249657 A1* | 8/2021 | Shin ...................... H01M 4/366 |

FOREIGN PATENT DOCUMENTS

| | | | |
|---|---|---|---|
| JP | H11-273665 A | | 10/1999 |
| JP | 2000-149954 A | | 5/2000 |
| JP | 2001307716 A | * | 11/2001 |
| JP | 2002-279975 A | | 9/2002 |
| JP | 2011-258333 A | | 12/2011 |
| JP | 2013-65478 A | | 4/2013 |
| JP | 2015-103451 A | | 6/2015 |
| JP | 2019-216101 A | | 12/2019 |
| WO | 2015/107896 A1 | | 7/2015 |
| WO | 2019/213068 A1 | | 11/2019 |

OTHER PUBLICATIONS

International Search Report dated Apr. 6, 2021, issued in counterpart Application No. PCT/JP2021/001563, with English Translation. (7 pages).

Written Opinion dated Apr. 6, 2021, issued in counterpart Application No. PCT/JP2021/001563. (5 pages).

Extended Supplementary European Search Report dated Jun. 24, 2024, issued in counterpart Application No. 21776906.6. (9 pages).

* cited by examiner

Figure 1(a)
Figure 1(b)
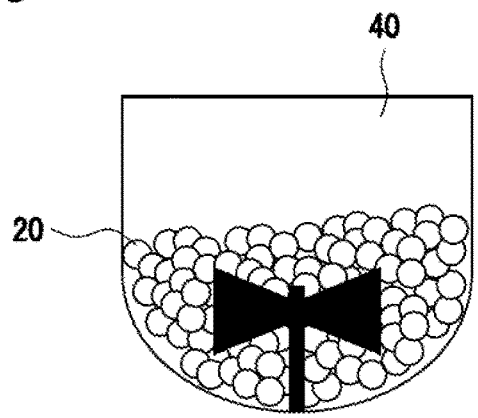
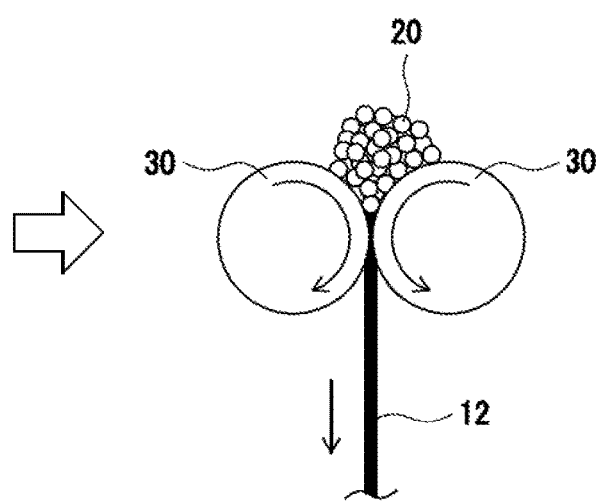
Figure 2
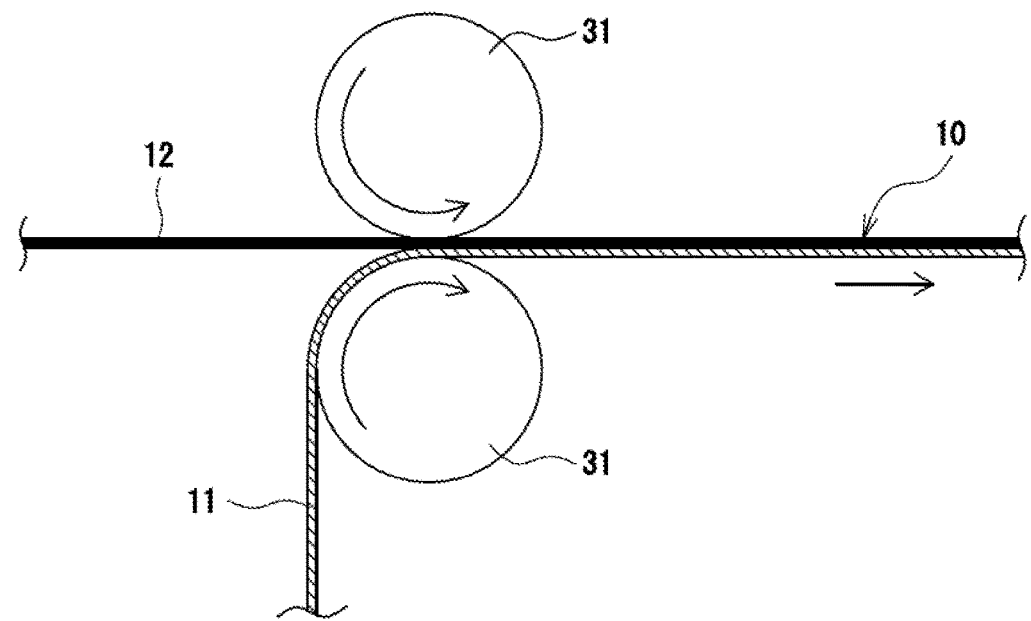

ELECTRODE FOR SECONDARY BATTERIES AND METHOD FOR PRODUCING SAME

CROSS-REFERENCE TO RELATED APPLICATION

This application is a National Phase Application filed under 35 U.S.C. §371 of International Application No. PCT/JP2021/001563 tiled on Jan. 19, 2021, which claims the benefit of priorities under 35 U.S.C. S119(a) of Japanese Patent Application No. 2020-052754 filed in Japan on Mar. 24, 2020, the contents of which are incorporated herein by reference.

TECHNICAL FIELD

The present disclosure generally relates to an electrode for a secondary battery and a method of manufacturing the same, and particularly to an electrode preferable for a non-aqueous electrolyte secondary battery such as a lithium-ion battery and a method of manufacturing the same.

BACKGROUND ART

An electrode of a non-aqueous electrolyte secondary battery such as a lithium-ion battery is typically manufactured with a wet method in which an electrode mixture slurry including an active material, a binder, and the like is applied onto a surface of a core being a metal foil. In this case, a drying step of evaporating and removing a solvent included in the coating film is required, and another problem is that migration, the travelling of the binder during drying of the coating film, easily occurs. The binder migration increases the amount of the binder on the surface side compared with the core side of the coating film (electrode mixture layer), leading to uneven distribution of the binder in the thickness direction of the electrode mixture layer.

Proposed in recent years is a dry method in which an electrode is manufactured by using a powdery electrode mixture without a solvent. For example, Patent Literature 1 describes a method of manufacturing an electrode comprising: supplying an electrode mixture powder on a surface of a core to be deposited, and pressuring this deposited layer in the thickness direction with heating. Also proposed is a method including rolling an electrode mixture and forming into a sheet, and then laminating this electrode mixture sheet onto a core.

CITATION LIST

Patent Literature

PATENT LITERATURE 1: Japanese Unexamined Patent Application Publication No. 2013-65478

SUMMARY

When a slurry including a binder is used in producing an electrode, a powdery binder is dissolved in a solvent of the slurry to allow the binder to exhibit a binding property, resulting in achievement of adhesiveness by the binder in a mixture layer and between the mixture layer and the core. However, as described above, the solvent included in the coating film is required to be evaporated and removed, and thus labor saving in the process and equipment has been difficult.

Meanwhile, in manufacturing an electrode with the dry method without a solvent, strong joining of the electrode mixture sheet to the core is not easy, and for example, a problem is that peeling of the electrode mixture sheet easily occurs. This is because the method does not use a slurry including a binder and can not utilize adhesiveness obtained by dissolving the binder in a solvent.

An electrode for a secondary battery according to the present disclosure comprises: a core; and an electrode mixture sheet joined to a surface of the core, wherein the electrode mixture sheet includes an active material, a fibrous first binder, and a particulate second binder, and the second binder is mainly composed of polyvinylidene fluoride and has a median diameter on a volumetric basis of 50 µm or smaller.

A method of manufacturing an electrode for a secondary battery according to the present disclosure comprises: mixing an active material, a fibrous first binder, and a particulate second binder mainly composed of polyvinylidene fluoride and having a median diameter on a volumetric basis of 50 µm or smaller without a solvent to produce an electrode mixture having a solid content concentration of substantially 100%; rolling the electrode mixture and forming into a sheet to produce an electrode mixture sheet; and heat-pressing a stacked body of the electrode mixture sheet and a core to join the electrode mixture sheet to a surface of the core.

An aspect of the present disclosure may provide an electrode for a secondary battery manufactured with a dry method, having a strong joining force of the electrode mixture sheet to the core, and having a high peeling strength of the electrode mixture sheet.

BRIEF DESCRIPTION OF DRAWINGS

FIG. 1(a) and FIG. 1(b) are a view illustrating a step of manufacturing an electrode of an example of an embodiment.

FIG. 2 is a view illustrating a step of manufacturing an electrode of an example of an embodiment.

DESCRIPTION OF EMBODIMENTS

Figure 3:
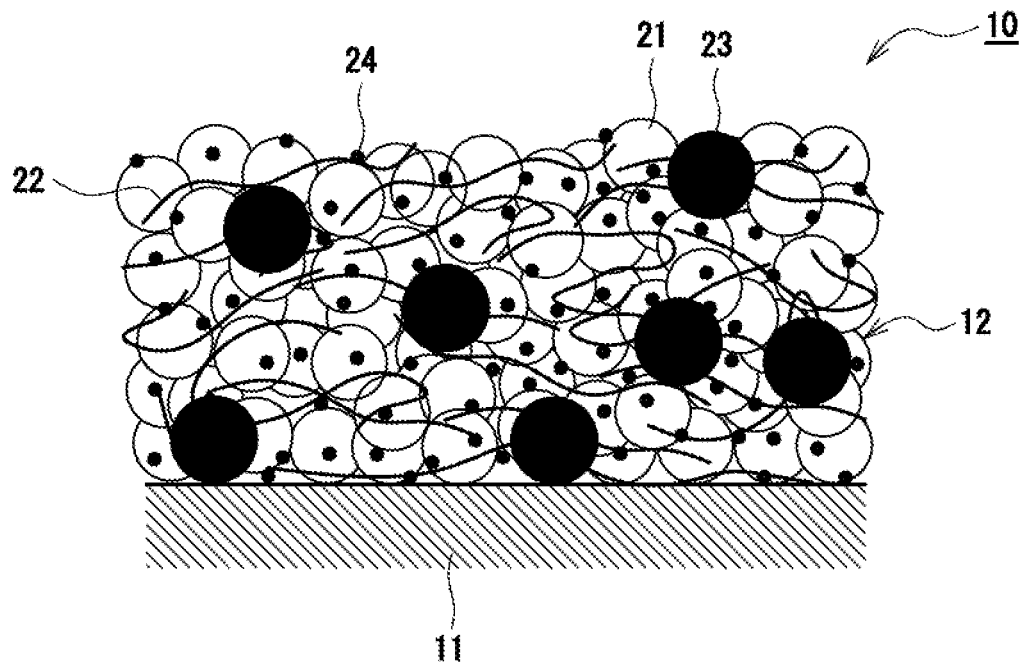
FIG. 3 is a cross-sectional view of an electrode of an example of an embodiment.

Hereinafter, embodiments of an electrode for a secondary battery according to the present disclosure and a method of manufacturing the same will be described in detail. Embodiments described below is merely an example, and the present disclosure is not limited to the following embodiments. The drawings referred to in the description of embodiments are schematically illustrated, and a size ratio and the like of constituents illustrated in the drawings should be determined with considering the following description.

Although the electrode for a secondary battery according to the present disclosure is preferable for a non-aqueous electrolyte secondary battery such as a lithium-ion battery, it may be applied to an aqueous battery including an aqueous electrolyte. Hereinafter, a positive electrode for a non-aqueous electrolyte secondary battery will be exemplified to make a description.

FIG. 1(a), FIG. 1(b) and FIG. 2 are views schematically illustrating a step of manufacturing a positive electrode 10 of an example of an embodiment, and FIG. 3 is a cross-sectional view of the positive electrode 10. As illustrated in FIG. 1(a), in a step of manufacturing the positive electrode 10, a positive electrode active material 21 (see FIG. 3) and a binder are dry-mixed without a solvent to produce a positive electrode mixture 20 having a solid content concentration of substantially 100%. The dry mix is a mixing method in which the positive electrode active material 21 and the binder are mixed without a solvent in a state of the solid content concentration being substantially 100%. During the dry mix, a conductive agent and the like may be added in addition to the positive electrode active material and the binder. Even when a material is added in addition to the positive electrode active material and the binder, the solid content concentration during the dry mix is substantially 100%.

Then, as illustrated in FIG. 1(b), the positive electrode mixture 20 is rolled for forming a sheet to produce a positive electrode mixture sheet 12. Thereafter, as illustrated in FIG. 2, a stacked body of the core 11 and the positive electrode mixture sheet 12 is heat-pressed to join the positive electrode mixture sheet 12 to the surface of the core 11. By the above steps, a positive electrode 10 in which a positive electrode mixture layer composed of the positive electrode mixture sheet 12 is provided on the surface of the core 11 is manufactured. Although details will be described later, the positive electrode mixture sheet 12 includes a fibrous first binder 22 and a particulate second binder 23.

[Positive Electrode]

As illustrated in FIG. 3, the positive electrode 10 comprises: the core 11; and the positive electrode mixture sheet 12 joined to the surface of the core 11. The positive electrode mixture sheet 12 is preferably provided on both the surfaces of the core 11. The positive electrode mixture sheet 12 includes the positive electrode active material 21, the fibrous first binder 22, and the particulate second binder 23. The positive electrode 10 may be a long electrode plate constituting a wound-type electrode assembly, and may be a rectangular electrode plate constituting a stacked-type electrode assembly. The positive electrode 10 is manufactured by laminating the positive electrode mixture sheet 12 onto the core 11 to be cut in a predetermined shape and size.

For the core 11, a metal foil having a thickness of 5 to 20 μm is used, for example. An example of the metal foil constituting the core 11 is a metal foil containing aluminum, and preferably an aluminum alloy foil containing aluminum as a main component (a component with the largest mass ratio) and containing at least one metal selected from iron, manganese, copper, magnesium, zirconium, silicon, chromium, titanium, and nickel.

The positive electrode mixture sheet 12 is provided on the surface of the core 11 to constitute a mixture layer of the positive electrode 10. As described above, the positive electrode mixture sheet 12 includes the fibrous first binder 22 and the particulate second binder 23 as the binder, and has a thickness of, for example, 30 to 120 μm, preferably 50 to 100 μm. By using the fibrous first binder 22, the positive electrode mixture 20 can be rolled and formed into a sheet. In addition, using the second binder 23 in combination improves a joining force of the positive electrode mixture sheet 12 to the core 11.

In order to increase electron conductivity, the positive electrode mixture sheet 12 preferably includes a conductive agent 24. As the conductive agent 24, carbon materials such as carbon black, acetylene black, Ketjenblack, and graphite may be exemplified. A content of the conductive agent 24 is, for example, 0.5 to 5 mass % based on a mass of the positive electrode mixture sheet 12. An example of a median diameter (D50) on a volumetric basis of the conductive agent 24 is 0.05 to 1 μm.

The positive electrode mixture sheet 12 is constituted with the positive electrode active material 21 as a main component. A content of the positive electrode active material 21 is preferably 85 to 99 mass %, and more preferably 90 to 98 mass %, based on a mass of the positive electrode mixture sheet 12. A D50 of the positive electrode active material 21 is, for example, 1 to 30 μm, preferably 2 to 15 μm, and more preferably 3 to 15 μm. The D50 of the positive electrode active material 21 and the conductive agent 24 are measured by using a laser diffraction-type particle size distribution measuring device (LA-920, manufactured by HORIBA, Ltd.) with water as a dispersion medium.

For the positive electrode active material 21, a lithium-transition metal composite oxide is typically used. Examples of a metal element contained in the lithium-transition metal composite oxide include Ni, Co, Mn, Al, B, Mg, Ti, V, Cr, Fe, Cu, Zn, Ga, Sr, Zr, Nb, In, Sn, Ta, and W. Among them, at least one of Ni, Co, and Mn is preferably contained. An example of preferable composite oxides is a lithium-transition metal composite oxide containing Ni, Co, and Mn, or a lithium-transition metal composite oxide containing Ni, Co, and Al.

The first binder 22 adheres to a particle surface of the positive electrode active material 21 to be intertwined with the positive electrode active material 21. In other words, the first binder 22 present in a mesh shape holds the positive electrode active material 21 to maintain the sheet shape. The first binder 22 is, for example, mainly composed of polytetrafluoroethylene (PTFE) and obtained by fibrillating PTFE particles. The first binder 22 may be constituted with only PTFE, and may contain a resin component other than PTFE as long as the object of the present disclosure is not impaired. A content of the first binder 22 is, for example, 0.05 to 10 mass %, preferably 0.1 to 8 mass %, and more preferably 0.2 to 5 mass %, based on a mass of the positive electrode mixture sheet 12.

The second binder 23 is mainly composed of polyvinylidene fluoride (PVdF) and has a median diameter (D50) on a volumetric basis of 50 μm or smaller. The D50 of the second binder 23 is measured by using a laser diffraction-type particle size distribution measuring device with water as a dispersion medium, similarly to the positive electrode active material 21 and the like. PVdF is not fibrillated during the step of producing the positive electrode mixture 20 to maintain the particulate state. The second binder 23 may be constituted with only PVdF, and may contain a resin component other than PVdF as long as the object of the present disclosure is not impaired. Hereinafter, the second binder 23 will be described as being the PVdF particles.

As described above, used for the second binder 23 is PVdF particles having a D50 of 50 μm or smaller. Using the first binder 22 and the second binder 23 having a D50 of 50 μm or smaller in combination specifically increases the joining force of the positive electrode mixture sheet 12 to the core 11, and remarkably improves the peeling strength of the positive electrode mixture sheet 12. It is to be noted that using PVdF particles having a D50 of larger than 50 μm may yield almost no effect of improvement in the joining force, and almost no change in the peeling strength compared with a case where only the first binder 22 is used as the binder.

A D50 of the second binder 23 is more preferably 40 μm or smaller, and particularly preferably 30 μm or smaller. A lower limit of the D50 is not particularly limited, and preferably 0.1 μm, more preferably 0.5 μm, and particularly preferably 1 μm. An example of preferable ranges of the D50 of the second binder 23 is 0.5 to 40 μm or 1 to 30 μm. In this case, the joining force of the positive electrode mixture sheet 12 to the core 11 is more remarkably improved. The D50 of the second binder 23 may be controlled within the target range by regulating a condition of polymerizing PVdF or by crushing the polymerized PVdF, for example.

A content of the second binder 23 is preferably lower than a content of the first binder 22. A specific example is the first binder 22: the second binder 23=1.5:1 to 10:1, 2:1 to 8:1, or 3:1 to 7:1 at a mass ratio. The content of the second binder 23 is, for example, 0.1 to 5 mass %, preferably 0.2 to 4 mass %, and more preferably 0.5 to 3 mass %, based on a mass of the positive electrode mixture sheet 12. In this case, an increase in the electrode plate resistance may be inhibited, and the peeling strength of the positive electrode mixture sheet 12 may be efficiently improved.

In the positive electrode 10, the positive electrode active material 21 may be embedded in the core 11. A maximum embedded depth D of the positive electrode active material 21 is, for example, 30% or more of a thickness of the core 11, and a specific example thereof is 6 μm or longer. Here, the embedded depth D of the positive electrode active material 21 means a length from the surface of the core 11 to a most embedded part of the positive electrode active material 21 along the thickness direction of the core 11. The embedded depth D may be measured by observing a cross section of the positive electrode 10 using an SEM. The maximum embedded depth D may be controlled with, for example, a softening temperature of the core 11, and a heating temperature and a pressing pressure in the heat-pressing step, described later.

In the positive electrode 10, when the positive electrode mixture sheet 12 is bisected in the thickness direction to define a first region and a second region from the core 11 side in this order, a difference between a content (a) of the second binder 23 in the first region and a content (b) of the second binder 23 in the second region, (a-b), is preferably within a range of 5%. The contents (a) and (b) may be substantially same.

That is, the second binder 23 is not unevenly distributed in a part of the positive electrode mixture sheet 12 but uniformly present in the entire sheet. Such a uniform distribution of the binder may be achieved with the dry method that causes no migration of the binder. Similar to the first binder 22, a difference between a content (A) of the first binder 22 in the first region and a content (B) of the first binder 22 in the second region, (A-B), is preferably within a range of ±5%.

A concentration distribution of the PVdF particles in the positive electrode mixture sheet 12 is measured with the following method.

(1) The positive electrode is immersed in an alkaline solution to polyenize PVdF in the positive electrode mixture sheet.
(2) The PVdF in the positive electrode mixture sheet treated in (1) is stained with bromine, Br.
(3) A cross section of the positive electrode including the stained PVdF is measured with an electron probe micro analyzer (EPMA), and a concentration distribution of Br is determined to specify this distribution as the concentration distribution of PVdF.

Figure 4:
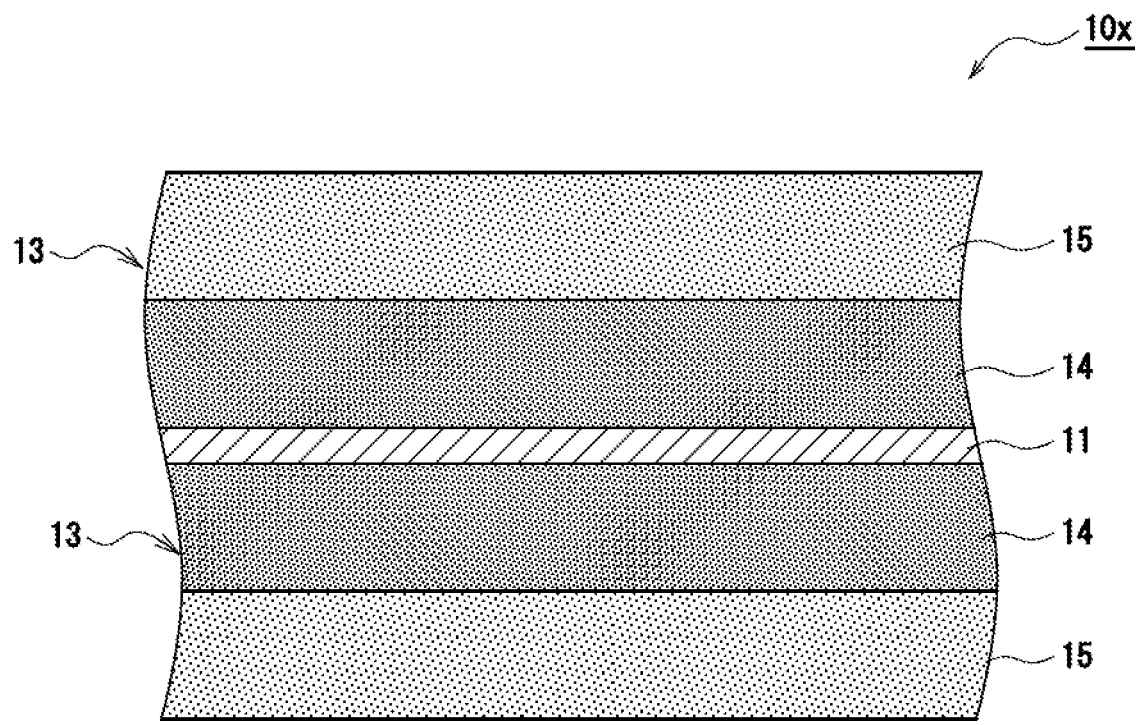
FIG. 4 is a cross-sectional view of an electrode of another example of an embodiment.

FIG. 4 is a cross-sectional view of a positive electrode mixture sheet 13 of another example of an embodiment. As illustrated in FIG. 4, the positive electrode mixture sheet 13 has a multilayer structure including: a first sheet 14 including the positive electrode active material 21 the first binder 22, the second binder 23, and a conductive agent 24; and a second sheet 15 including the positive electrode active material 21, the first binder 22, and the conductive agent 24, and being substantially free of the second binder 23, and the first sheet 14 and the second sheet 15 are disposed in this order from the core 11 side. According to the positive electrode mixture sheet 13, an increase in the electrode plate resistance may be inhibited, and the peeling strength of the positive electrode mixture sheet 13 may be efficiently improved.

Both of the first sheet 14 and the second sheet 15 are preferably produced with the dry method, and the sheets are laminated in the heat-pressing step or before the heat-pressing step, described later, to form the positive electrode mixture sheet 13. Thicknesses of each sheet are not particularly limited, and each sheet may have substantially same thickness. Alternatively, the first sheet 14 may be thinner than the second sheet 15. The second sheet 15 may be thinner than the first sheet 14. An example of the thicknesses of each sheet is 30 to 60 μm. Contents of each component in the first sheet 14 is, for example, same in a case of the positive electrode mixture sheet 12. The second sheet 15, which is substantially free of the second binder 23, may have a larger content of at least one of the positive electrode active material 21, the first binder 22, and the conductive agent 24 than the first sheet 14.

[Negative Electrode]

The negative electrode comprises: a core constituted with a metal foil; and a negative electrode mixture layer provided on a surface of the core. For the core of the negative electrode, a copper foil is typically used. For the negative electrode, a conventionally known electrode plate manufactured with the wet method may be used, and an electrode plate comprising a negative electrode mixture sheet manufactured with the dry method may be used. The negative electrode comprises a negative electrode mixture sheet including the fibrous first binder and the particulate second binder, and may have the same constitution as the above positive electrode 10.

For the negative electrode active material, a carbon-based active material such as: a natural graphite such as flake graphite, massive graphite, and amorphous graphite; and an artificial graphite such as massive artificial graphite (MAG) and graphitized mesophase-carbon microbead (MCMB) is used, for example. For the negative electrode active material, a Si-based active material and the like that forms an alloy with lithium may also be used. Since the carbon-based active material has a higher electron conductivity than the positive electrode active material 21, the negative electrode may not include a conductive agent 24.

[Non-Aqueous Electrolyte Secondary Battery]

A non-aqueous electrolyte secondary battery of an example of an embodiment comprises: an electrode assembly in which the above positive electrode 10 and the negative electrode are stacked with a separator interposed therebetween; a non-aqueous electrolyte; and an exterior housing body housing them. The electrode assembly may be any of a wound-type electrode assembly and a stacked-type electrode assembly. Examples of the exterior housing body include a cylindrical exterior housing can, a rectangular exterior housing can, a coin-shaped exterior housing can, and an exterior housing can constituted with an aluminum laminated sheet.

The non-aqueous electrolyte includes a non-aqueous solvent and an electrolyte salt dissolved in the non-aqueous solvent. For the non-aqueous solvent, esters, ethers, nitriles, amides, a mixed solvent of two or more thereof, and the like are used, for example. The non-aqueous solvent may contain a halogen-substitute in which at least a part of hydrogens in these solvents is substituted with a halogen atom such as fluorine. For the electrolyte salt, a lithium salt such as $LiPF_6$ is used, for example. The electrolyte is not limited to a liquid electrolyte, and may be a solid electrolyte.

[Method of Manufacturing Positive Electrode]

Hereinafter, a method of manufacturing the positive electrode 10 will be described in detail. Although the method of manufacturing the positive electrode 10 including the conductive agent will be exemplified below, the following manufacturing method may be similarly applied to manufacture of the negative electrode. In a case of the negative electrode, a negative electrode active material is used instead of the positive electrode active material, and the conductive agent may not be added into the mixture sheet.

As illustrated in FIG. 1(*a*), in the step of manufacturing the electrode 10, the positive electrode active material 21, PTFE particles, PVdF particles (the second binder 23), and the conductive agent 24 are firstly added into a mixer 40, and these materials are mixed with fibrillating the PTFE particles to produce the electrode mixture 20 (hereinafter, this step is referred to as "first step"). Next, as illustrated in FIG. 1(*b*), the electrode mixture 20 is rolled and formed into a sheet to produce the electrode mixture sheet 12 (hereinafter, this step is referred to as "second step"). This manufacturing step is a dry method of manufacturing the electrode 10 by using the electrode mixture 20 having a solid content concentration of substantially 100%.

For the PTFE particles, particles having a D50 of 5 to 100 μm are used, for example. In this case, a mixing treatment may be performed with a relatively low shear force in a short time, and may yield the positive electrode mixture sheet 12 having less particle crack of the positive electrode active material 21, good dispersibility of the constituting materials, and a high rupture strength. The PTFE particles are fibrillated in the first step to be the fibrous first binder 22. Used for the second binder 23 is PVdF particles having a D50 of 50 μm or smaller, preferably 0.5 to 40 μm, or 1 to 30 μm. PVdF is not fibrillated in the first step, and maintains the pre-mixing particle shape and D50.

Although conventionally known apparatuses may be used for the mixer 40, a mechanically stirring mixer is preferably used. Specific examples of a preferable mixer 40 include: a cutter mill, a pin mill, a beads mill, a fine particle composer (a machine that generates a shear force between a rotor having a special shape and rotating at a high speed inside a tank and an impact plate), which are machines that may apply a mechanical shear force; a granulator; a kneader such as a twin screw extruding kneader and a planetary mixer. Among them, a cutter mill, a fine particle composer, a granulator, or a twin screw extruding kneader are preferable.

As illustrated in FIG. 1(*b*), in the second step, the electrode mixture 20 is rolled and formed into a sheet by using two rolls 30. The two rolls 30 are disposed with a predetermined gap, and rotate in the same direction. The electrode mixture 20 is fed into the gap between the two rolls 30 to be compressed with the two rolls 30, to be stretched into a sheet. The two rolls 30 have, for example, the same roll diameter. The obtained electrode mixture sheet 12 may be passed through the gap between the two rolls 30 a plurality of times, and may be stretched by using another roll having a different roll diameter, peripheral speed, gap, and the like one or more times. The roll may be heated to heat-press the electrode mixture sheet 12.

A thickness of the electrode mixture sheet 12 may be regulated with, for example, the gap between the two rolls 30, the peripheral speed, the number of the stretching treatment, and the like. In the second step, the electrode mixture 20 is preferably formed into a sheet by using two rolls 30 having peripheral speeds differing by a factor of two or more. Setting the peripheral speeds of the two rolls 30 to be different facilitates the thinning of the electrode mixture sheet 12 to improve the productivity, for example. The peripheral speed ratio of the two rolls 30 is preferably 2.5 or more, and may be 3 or more. The peripheral speed ratio of the two rolls 30 is, for example, 1:3.

Next, as illustrated in FIG. 2, the electrode mixture sheet 12 is laminated onto the core 11 to obtain the electrode 10 in which a mixture layer composed of the electrode mixture sheet 12 is provided on the surface of the core 11 (hereinafter, this step is referred to as "third step"). Although FIG. 2 illustrates a state where the electrode mixture sheet 12 is joined to only one surface of the core 11, the electrode mixture sheet 12 is preferably joined to both the surfaces of the core 11. The two electrode mixture sheets 12 may be joined to both the surfaces of the core 11 simultaneously. It is also acceptable that one sheet is joined to one surface of the core 11 and then another sheet is joined to the other surface.

In the third step, the electrode mixture sheet 12 is laminated onto the surface of the core 11 by using two rolls 31. The two rolls 31 have, for example, the same roll diameter, are disposed with a predetermined gap, and rotate in the same direction at the same peripheral speed. The two rolls 31 are preferably heated to a predetermined temperature to apply a predetermined pressure.

The electrode 10 manufactured via the above steps has the positive electrode mixture sheet 12 strongly joined to the core 11 and having a high peeling strength, as demonstrated in the following Examples.

EXAMPLES

Hereinafter, the present disclosure will be further described with Examples, but the present disclosure is not limited to these Examples.

Example 1

[Production of Positive Electrode Mixture]

A positive electrode active material, PTFE particles having a D50 of 10 μm, PVdF particles having a D50 of 25 μm, and acetylene black were mixed at a mass ratio of 100:4:0.8:0.9 by using a mixer (Wonder Crusher, manufactured by OSAKA CHEMICAL Co., Ltd.). This mixing treatment yielded a positive electrode mixture in which the PTFE particles were fibrillated, and the active material, the fibrous PTFE, the PVdF particles, and acetylene black were uniformly dispersed. The obtained positive electrode mixture had a solid content concentration of 100%.

[Production of Positive Electrode Mixture Sheet]

The obtained positive electrode mixture was rolled by passing between two rolls to produce a positive electrode mixture sheet. A peripheral speed ratio of the two rolls was set to be 1:3, and the stretching treatment was performed a plurality of times to regulate a thickness of the positive electrode mixture sheet to be 130 μm.

[Production of Positive Electrode]

The obtained positive electrode mixture sheet was disposed on a surface of a core, and a stacked body of the positive electrode mixture sheet and the core was heat-pressed by using two rolls heated to 200° C. (pressing pressure: 0.2 [t/cm]). This heat-pressing yielded a positive electrode in which the positive electrode mixture sheet was strongly joined to the surface of the core. Used for the core was an aluminum alloy foil having a thickness of 15 μm.

On the obtained positive electrode, a peeling strength of the positive electrode mixture sheet was evaluated with the following methods. Table 1 shows the evaluation results together with a D50 of the used PVdF particles (the second binder).

[Evaluation of Peeling Strength]
(1) The positive electrode was fixed on a stand in a state where the core side was directed to the stand side.
(2) A part of the positive electrode mixture sheet was peeled from the fixed positive electrode to be bent at 90° with respect to the core.
(3) The 90°-bent positive electrode mixture sheet was drawn by using a universal tester, and a force required to peel the sheet was measured to specify this force as the peeling strength.

Example 2

A positive electrode was produced to evaluate the peeling strength in the same manner as in Example 1 except that PVdF particles having a D50 of 10 μm were used as the second binder.

Comparative Example 1

A positive electrode was produced to evaluate the peeling strength in the same manner as in Example 1 except that no second binder was used.

Comparative Example 2

A positive electrode was produced to evaluate the peeling strength in the same manner as in Example 1 except that PVdF particles having a D50 of 150 μm were used as the second binder.

TABLE 1

| | Second binder | D50 of second binder (μm) | Peeling strength (N/m) |
|---|---|---|---|
| Comparative Example 1 | — | — | 1.4 |
| Comparative Example 2 | PVdF | 150 | 1.9 |
| Example 1 | PVdF | 25 | 15.6 |
| Example 2 | PVdF | 10 | 23.0 |

As shown in Table 1, any of the positive electrodes of Examples have a remarkably higher peeling strength than the positive electrode of Comparative Example, and it is found that the positive electrode mixture sheet is strongly joined to the core. Even including the PVdF particles as the second binder, the positive electrode of Comparative Example 2 had a peeling strength similar to the positive electrode of Comparative Example 1 including no PVdF particles. That is, the D50 of the second binder significantly affect the peeling strength of the positive electrode mixture sheet. When the PVdF particles have a large particle diameter, the PVdF particles are not melted in the heat-pressing step in a short time to exhibit an insufficient adhesive force. Even if the PVdF particles are melted, the PVdF particles have excessively larger particle diameter than the active material particles and have a low addition amount; thus, an insufficient adhesive area with the active material particles is considered to be a cause of no improvement in the peeling strength.

As above, only when the fibrous first binder is used together with the second binder having a regulated D50 within the predetermined range, the peeling strength of the positive electrode mixture sheet is specifically improved. Although Table 1 shows evaluation results of using the second binder having D50 of 10 μm or 25 μm, the high peeling strength may be obtained when the D50 is 50 μm or smaller, preferably within a range of 1 to 30 μm.

REFERENCE SIGNS LIST

10 Positive electrode
11 Core
12, 13 Positive electrode mixture sheet
14 First sheet
15 Second sheet
20 Positive electrode mixture
21 Positive electrode active material
22 First binder
23 Second binder
24 Conductive agent
30, 31 Roll
40 Mixer

The invention claimed is:

1. An electrode for a secondary battery, comprising:
a core; and
an electrode mixture sheet joined to a surface of the core, wherein
the electrode mixture has a multilayer structure including:
a first sheet including an active material, a fibrous first binder, a particulate second binder, and a conductive agent; and a second sheet including the active material, the first binder, and the conductive agent, and being substantially free of the second binder, the first sheet and the second sheet being disposed in this order from a core side, and
the second binder is mainly composed of polyvinylidene fluoride and has a median diameter on a volumetric basis of 50 μm or smaller.

2. The electrode for a secondary battery according to claim 1, wherein when the electrode mixture sheet is bisected in a thickness direction to define a first region and a second region from the core side in this order, a difference between a content (a) of the second binder in the first region and a content (b) of the second binder in the second region is within a range of ±5%.

3. The electrode for a secondary battery according to claim 1, wherein the first binder is mainly composed of polytetrafluoroethylene.

4. The electrode for a secondary battery according to claim 1, wherein
a content of the second binder is lower than a content of the first binder,
the first binder in an amount of 0.05 to 10 mass % based on a mass of the electrode mixture sheet is included, and
the second binder in an amount of 0.1 to 5 mass % based on a mass of the electrode mixture sheet is included.

5. A method of manufacturing an electrode for a secondary battery, the method comprising:
mixing an active material, a fibrous first binder, and a particulate second binder mainly composed of polyvinylidene fluoride and having a median diameter on a volumetric basis of 50 μm or smaller without a solvent to produce an electrode mixture having a solid content concentration of substantially 100%;

rolling the electrode mixture and forming into a sheet to produce an electrode mixture sheet; and heat-pressing a stacked body of the electrode mixture sheet and a core to join the electrode mixture sheet to a surface of the core wherein the electrode mixture has a multilayer structure including: a first sheet including an active material, a fibrous first binder, a particulate second binder, and a conductive agent; and a second sheet including the active material, the first binder, and the conductive agent, and being substantially free of the second binder, the first sheet and the second sheet being disposed in this order from core side.

\* \* \* \* \*